Jan. 11, 1938.   B. B. TALLEY   2,104,778
PLOTTING DEVICE
Filed Nov. 24, 1936   2 Sheets-Sheet 1
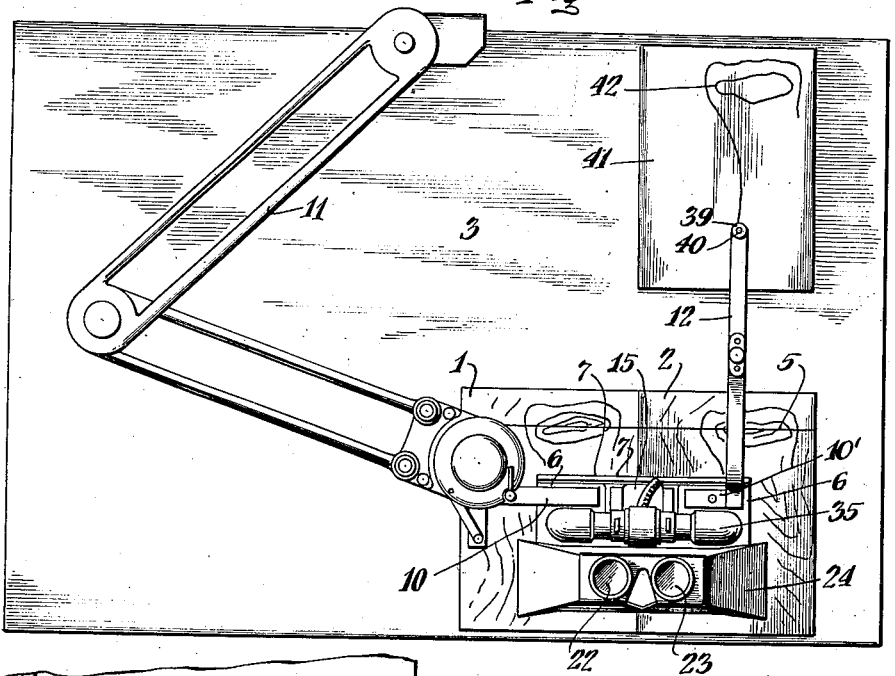

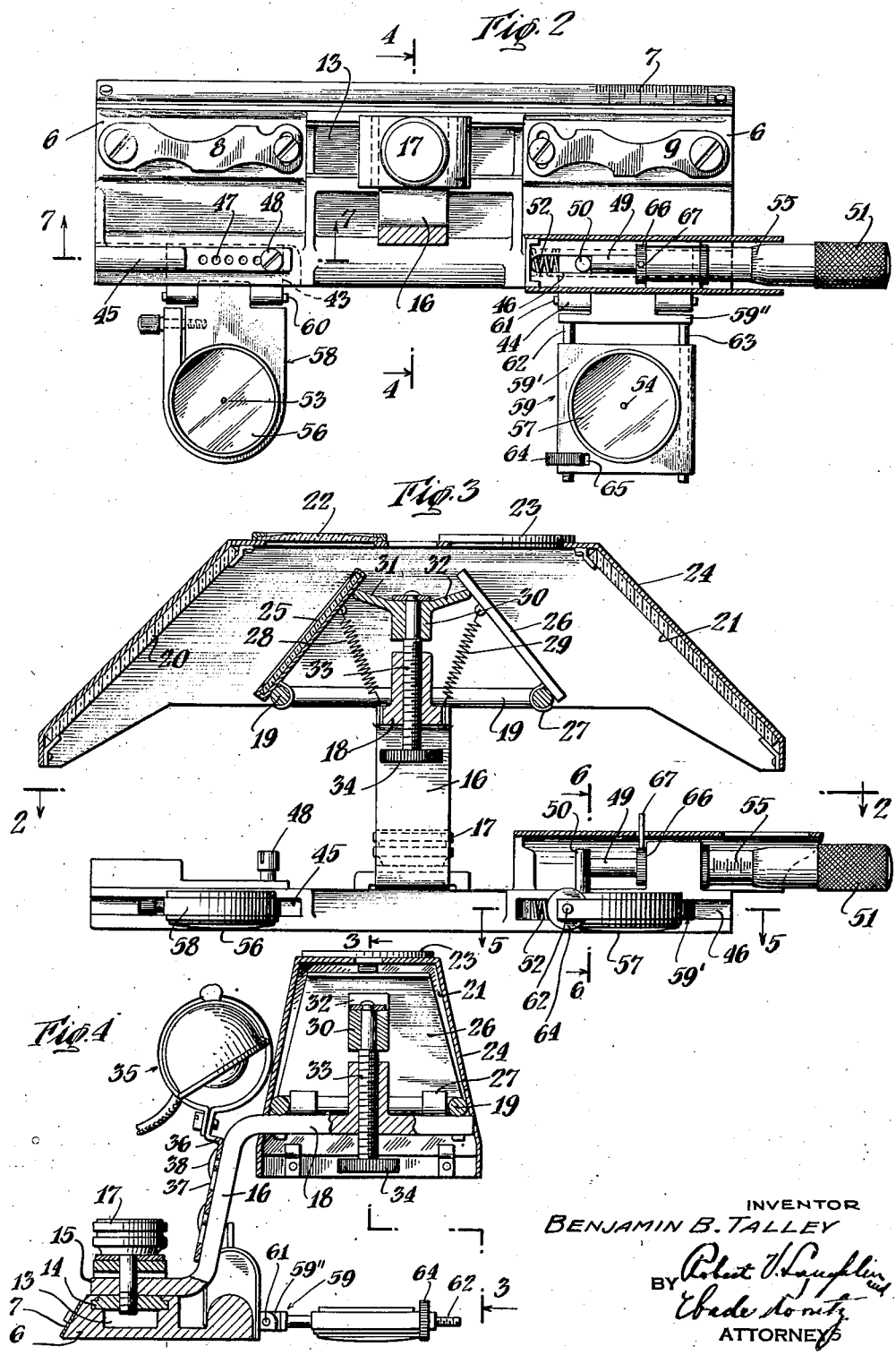

Patented Jan. 11, 1938

2,104,778

UNITED STATES PATENT OFFICE 2,104,778

PLOTTING DEVICE

Benjamin B. Talley, Fairfield, Ohio,

Application November 24, 1936, Serial No. 112,500

14 Claims. (Cl. 33—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates in general to apparatus for plotting maps from photographs and has particular reference to an instrument adapted to make use of the parallax principle of measurement for the determination of heights of objects by means of stereoscopic observation of overlapping vertical aerial photographs or oblique photographs restituted to the vertical.

Measurement of the parallax differences of an object in a pair of stereoscopically overlapping photographs to thereby obtain functions readily convertible into actual distances has been effected heretofore by means comprising a pair of adjustable index marks which, when properly adjusted, merge stereoscopically and appear as a single floating mark. To the observer this stereoscopic floating mark may be made to appear to rise or fall in space above, in contact with, and below the apparent spacial stereoscopic image and when in apparent contact with the image may be utilized to measure the parallax difference, due to the differences in distance of the several points of the objects photographed from the photographic objective.

In accordance with the present invention, a map plotting device is provided which operates according to the aforementioned stereoscopic parallax principle and embodies numerous improvements over the devices heretofore employed, including means for maintaining correct stereoscopic orientation of the instrument while it is freely movable in all directions over the plotting board, means for making accurate adjustments and compensations to secure accurate parallax measurements, means for correcting for tilt in the subject photograph, and other improvements which will become apparent from the following description.

For a more complete understanding of the invention, reference may be had to the accompanying drawings, in which:

Figure 1 is a plan view of the instrument and illustrates its mode of operation on a plotting board;

Fig. 2 is a horizontal section therethrough as seen along the line 2—2 of Fig. 3;

Fig. 3 is a vertical section therethrough as seen along the line 3—3 of Fig. 4;

Fig. 4 is a transverse section as seen along the line 4—4 of Fig. 2;

Fig. 5 is an enlarged horizontal section through the right hand index mark holder as seen along the line 5—5 of Fig. 3;

Fig. 6 is an enlarged vertical section through the right hand index mark holder as seen along the line 6—6 of Fig. 3; and Fig. 7 is an enlarged vertical section through the adjusting means of the left hand index mark holder.

Referring to the drawings, there is shown at 1 and 2 of Figure 1 a pair of vertical overlapping aerial photographs adapted for stereoscopic observation, these photographs being shown as lying on a flat surface such as a drafting board 3, in prolongation of their common stereoscopic base 5. The photographs 1 and 2 are spaced a distance apart depending upon the initial setting of two index marks more particularly described hereinafter.

As illustrated particularly in Fig. 2, the instrument comprises a base 6 having a rear straight edge provided with a measuring scale 7. Also secured on the base 6 are the male elements 8 and 9 of a wedged dovetail coupling adapted to receive the respective female elements 10 and 10' of a conventional type of drafting machine 11 and of an arm 12. Thus the base 6 is rigidly but detachably secured to the drafting machine for parallel movement therewith, while the arm 12 is similarly secured to the base 6 for reasons to be described. The arm 12 hereinbefore described may be made any convenient length so that the end 39 to which is fixed a pencil, pen, or other stylus 40 will rest on the drawing medium 41 which may be drawing paper, a duplicate of the photograph, or the like.

Formed in the base 6 is a slot 13 adapted to receive the slide 14 to which is secured the lower angular arm 15 of bracket 16. Slide 14 and consequently bracket 16 are adapted to be locked in any desired position relative to base 6 by means of locking screw 17.

Fixed to the upper angular arm 18 of bracket 16 is a rectangular frame 19 supporting a stereoscope comprising angle mirrors 20 and 21 and eyepieces 22 and 23 supported by hood 24 in any suitable manner. Cooperating respectively with mirrors 20 and 21 are mirrors 25 and 26 adjustably mounted on frame 19 by pivot clips 27. Near the opposite ends of mirrors 25 and 26 are attached springs 28 and 29, their other ends being fastened to the bracket 16. In this manner the mirrors are held against the arms 31 and 32 of member 30 carried by stud 33 threaded through bracket 16 and having a knob 34. By adjusting member 30 by turning knob 34 the angular disposition of mirrors 25 and 26 may be adjusted to suit the individual operator.

An illuminating device 35 is also supported on the bracket 16 by a clip and provides sufficient and uniform illumination of the photographs. The clip 36 is provided with bayonet type slots 37 adapted to engage bayonet pins 38 on the bracket 16. In this manner the illuminating system may be readily attached or removed.

Mounted on the front edge of the instrument are two carriages 43 and 44 providing adjustable index marks. Carriages 43 and 44 are independently adjustable in a direction parallel to the longitudinal axis of the instrument in slots 45 and 46. Carriage 43 is adjustable in steps determined by the spacing of dowel holes 47 and is fixed in the desired adjusted position by a dowel pin 48 inserted in the proper hole 47. Carriage 44 is movable by means of a micrometer screw 49, which, when its knob 51 is rotated in one direction, presses against pin 50 to effect movement against spring 52. As knob 51 is rotated in the other direction, spring 52 moves carriage 44 in the opposite direction.

The micrometer screw 49 is provided with a locking device 66 operated by pin 67 whereby it may be locked in position after the proper setting has been made. This lock is provided so the position of the index mark will not be altered as the instrument is moved over the photographs in tracing the form line for that particular elevation.

Index marks 53 and 54 are etched or otherwise formed on glass discs 56 and 57, preferably on the under side thereof. These discs are slightly convex in form so that the index marks rest on the photographs when in the position shown in Figures 2 and 3 and normally lie in a common plane parallel to straight edge 7 and normal to the photographs 1 and 2. Discs 56 and 57 are supported by holders 58 and 59 which are pivotally connected to carriages 43 and 44 by pivot pins at 60 and 61. Holders 58 and 59 may thus be folded back out of the way when it is desired to use the instrument as a simple stereoscope.

Index mark holder 59 is adjustable in a direction normal to the longitudinal axis of the instrument, having a portion 59' actually supporting disc 57 slidably mounted on pins 62 and 63 carried by part 59''. One of these pins, 62, is screw threaded and engaged by nut 64 in slot 65 of holder 59'. As nut 64 is rotated, holder 59' is moved in the direction stated away from or toward the base 6. In this manner corrections may be made for tilt in a manner to be described.

In operation, the instrument is adapted to be attached to drafting machine 11. The photographs are properly orientated with respect to their stereoscopic base as explained and this base line 5 is then orientated so as to be parallel to the base 7 of the instrument. The photographs are then fixed in position and since the instrument may only be moved parallel to and at right angles to the base when attached to the drafting machine, correct stereoscopic orientation is maintained at all times.

By properly adjusting holders 58 and 59, index marks 53 and 54 may be made to rest on corresponding detail points of the two photographs. These index marks then fuse when viewed stereoscopically and movement of the micrometer screw 51 causes the fused mark to appear to rise or fall until it is apparently brought to rest on the ground. Movement of the instrument over the photographs such as to keep the mark apparently resting on the ground, will trace on the drawing medium 41 by means of pencil 40 the form lines 42, which indicate points of equal elevation. Relative differences in heights of objects may be obtained by successively seating the floating mark on objects as described and noting the parallax values as indicated on the scale 55 of the micrometer.

These scale readings may readily be converted into corresponding scale elevation values from the scale of the picture determined from the altitude at which the picture was taken, the base length or percentage of overlap, and the camera focal length, or by direct comparison with the known elevations of certain control points. Since the index marks must rest on the objects in order to measure the difference in parallax, any tilt in one photograph results in displacement of the objects away from the stereoscopic base. This tilt is compensated for by means of nut 64, which permits the operator to make the necessary correction by moving index mark 54 out of the normal plane extending parallel to line 5 and edge 7.

It will be observed that the present instrument does not employ the nodal point of the lens as in instruments designed for use in drawing contour or form lines from a pair of stereoscopic photographs, but uses normal observation. In other words, the scanning rays are always directed normal to the picture, so that the parallax is measured in the direction of flight, i. e., parallel to the stereoscopic base. Thus, the operator is enabled to measure differences in height from the component of parallax regardless of the angular coverage of the lens and therefore he can extend the useful area well out toward the extremities of the wings of the picture, such as one made with a multi-lens camera.

While a preferred embodiment of the invention has been illustrated and described herein, it is to be understood that the invention is not limited thereby, but is susceptible of changes in form and detail within its scope.

I claim:

1. In combination with a plotting board, a support movable bodily over the board, means holding said support at a predetermined orientation for any position thereof on said board, stereoscopic means on said support for scanning graphic subject-matter on said board, and a plotting stylus carried by said support for tracing on said board the movement of said support.

2. In a plotting device for plotting maps from photographs, the combination of a plotting surface, a stereoscope bodily movable in scanning relation over said photographs, a stylus connected to said stereoscope for tracing form lines on said plotting surface in accordance with the movements of said stereoscope, and flexible guide means for said stereoscope affording parallel movement of the latter in all directions in a plane substantially parallel to the plane of said photographs.

3. In combination with a pantographic type of "drafting machine" and a board therefor having photographs and a plotting surface laid thereon, a stereoscope carried by said machine for movement at predetermined orientation over said photographs, and a stylus operatively connected to said stereoscope and engaging said surface for tracing form lines thereon in accordance with the movements of said stereoscope.

4. In combination with a pantographic type of "drafting machine" and a board therefor having photographs and a plotting surface laid thereon, a stereoscope, carried by said machine for movement at predetermined orientation over said photographs, an arm fixed to said stereoscope and extending over said plotting surface, and a stylus on said arm for tracing form lines on said plotting surface in accordance with the movements of said stereoscope.

5. In combination with a pantographic type of "drafting machine" and a board therefor having photographs and a plotting surface laid thereon, a stereoscope carried by said machine for movement at predetermined orientation over said photographs, reference mark members in the field of view of said stereoscope and carried thereby to rest directly on the surface of the photographs, and a stylus operatively connected to said stereoscope for tracing form lines on said plotting surface in accordance with the movements of said stereoscope.

6. In combination with a pantographic type of "drafting machine" and a board therefor having photographs and a plotting surface laid thereon, a stereoscope carried by said machine for movement at predetermined orientation over said photographs, reference mark members in the field of view of said stereoscope and carried thereby to rest directly on the surface of the photographs, said marks normally lying in a common vertical plane of reference, a stylus operatively connected to said stereoscope for tracing form lines on said plotting surface in accordance with the movements of said stereoscope, and means for adjusting at least one of said reference mark members relatively to the other member out of said plane.

7. In a plotting device for plotting maps from photographs, the combination of a stereoscope movable over the photographs, spaced index marks therefor lying in a common vertical plane of reference, and means for adjusting one of said marks out of said plane to compensate for photographic tilt.

8. In a plotting device for plotting maps from photographs, the combination of a stereoscope movable over the photographs, spaced index marks therefor lying in a common vertical plane of reference, means affording a relatively coarse adjustment of one of said marks relatively to said other mark in said plane, and means affording a relatively fine adjustment of said other mark relatively to said one mark in said plane.

9. In a plotting device for plotting maps from photographs, the combination of a stereoscope movable over the photographs, spaced index marks therefor lying in a common vertical plane of reference, means for adjusting one of said marks relatively to the other mark in said plane, and means for adjusting one of said marks relatively to said plane independently of the other mark to compensate for photographic tilt.

10. In a plotting device for plotting maps from photographs, the combination of a stereoscope movable over the photographs, spaced index marks therefor lying in a common vertical plane of reference, a straight edge on said stereoscope parallel to said plane for cooperation with the base line of said photographs, and means for adjusting one of said index marks normally to said plane and edge to compensate for photographic tilt.

11. In a plotting device for plotting maps from photographs, the combination of a stereoscope movable over the photographs, spaced index marks therefor lying in a common vertical plane of reference, holders for said marks, means for simultaneously relatively adjusting said marks and stereoscope parallel to said plane, and means for individually adjusting said marks relatively to said stereoscope parallel to said plane.

12. In a plotting device for plotting maps from photographs, the combination of a stereoscope movable over the photographs, spaced index marks therefor lying in a common vertical plane of reference, holders for said marks pivoted about axes parallel to said plane for movement out of the field of said stereoscope, and means for individually adjusting each holder relatively to the other holder in directions parallel to their axes.

13. In a plotting device for plotting maps from photographs, the combination of a stereoscope movable over the photographs, spaced index marks therefor lying in a common vertical plane of reference, holders for said marks, a guide for one of said holders extending normal to said plane, and means for adjusting said holder along said guide.

14. In a plotting device for plotting maps from a pair of aerial photographs arranged with a common stereoscopic base line directed in the direction of movement of the camera, a stereoscope movable on the photographs, means constraining the movement of said stereoscope parallel to said base line, and reference marks for said stereoscope positioned substantially in a plane parallel to said base line, whereby the component of parallax parallel to the stereoscopic base may be directly measured.

BENJAMIN B. TALLEY.